(No Model.)
L. F. JOHNSON.
GALVANIC BATTERY.
No. 522,836. Patented July 10, 1894.
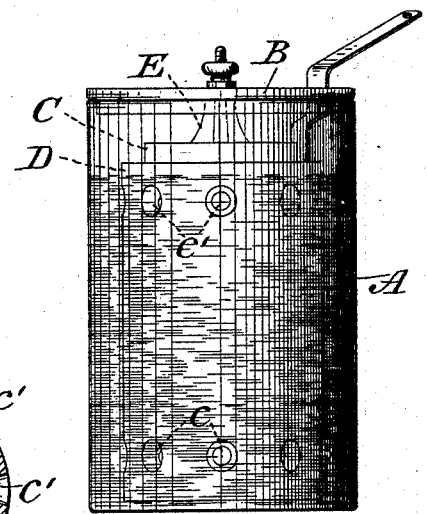
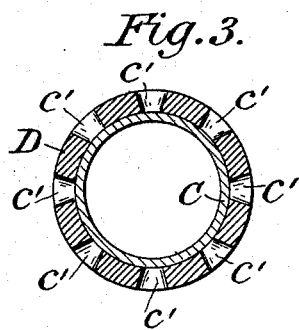
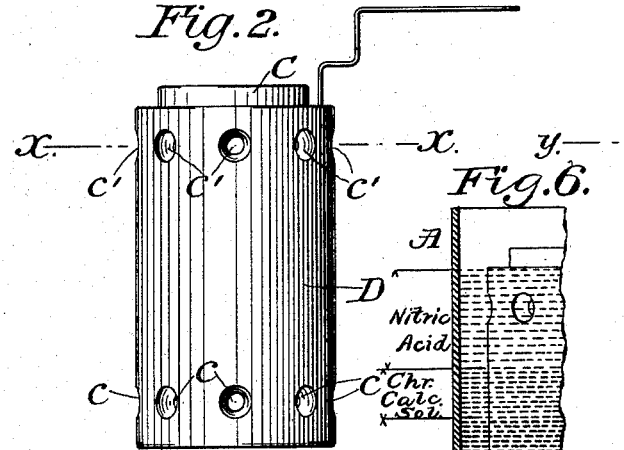
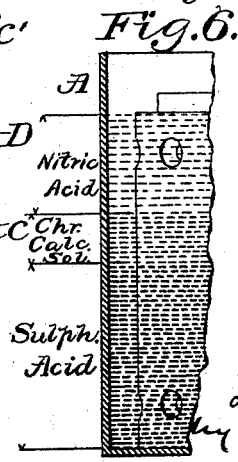
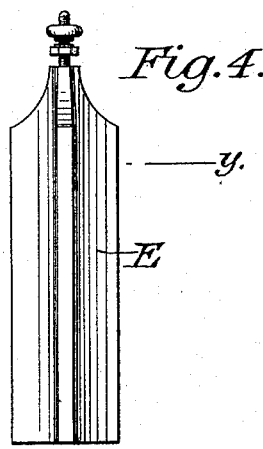
Attest:
D. Petri-Palmedo
A. N. Jesbera
Inventor:
Louis F. Johnson
by William B. Greeley
Att'y.

UNITED STATES PATENT OFFICE.

LOUIS F. JOHNSON, OF POUGHKEEPSIE, NEW YORK.

GALVANIC BATTERY.

SPECIFICATION forming part of Letters Patent No. 522,836, dated July 10, 1894.

Application filed April 7, 1894. Serial No. 506,757. (No model.)

*To all whom it may concern:*

Be it known that I, LOUIS F. JOHNSON, of Poughkeepsie, in the county of Dutchess and State of New York, have invented certain new and useful Improvements in Galvanic Batteries; and I do hereby declare that the following is a full and exact description thereof, reference being had to the accompanying drawings, and to the letters of reference marked thereon, making a part of this specification.

This invention relates to galvanic batteries and its object is to prolong the period during which the battery shall develop a current of constant strength and to increase the electromotive force while the expense of setting up and maintaining the battery shall be kept within moderate bounds.

The invention consists in part in the construction of the cell and in part in the composition of the electrolyte. The results which follow primarily from the present improvements and which contribute mutually to the attainment of the general object and the increased efficiency of the battery, are an effective depolarization, a retardation of the deposition of crystals upon the elements and a prevention of the attack of the electrolyte mainly upon the middle portion of the zinc or positive electrode, as usual, rather than uniformly upon the whole surface.

The improved battery will be described in detail hereinafter and the special features of novelty will be set forth in the claims.

In the accompanying drawings: Figure 1 is a view in elevation of a single galvanic cell constructed in accordance with the invention. Fig. 2 is an elevation of the continued porous cup and negative element removed from the jar. Fig. 3 is a section on the line $x$—$x$ of Fig. 2. Fig. 4 is an elevation of the positive element by itself. Fig. 5 is a section on the line $y$—$y$ of Fig. 4, and Fig. 6 is a partial, vertical section, illustrating the arrangement of the different portions of the electrolyte between the jar and the porous cup.

The outer jar A is of any suitable material, shape and size and is preferably provided with a cover B having apertures through which are passed the conductors attached to the electrodes. Within the jar is placed a porous cup C. The negative or carbon electrode is outside of the porous cup, but instead of being an independent bar or plate, is formed as a cylinder D which entirely surrounds the porous cup C and is in surface contact therewith as indicated in Fig. 3, the carbon being preferably molded upon the porous cup. Near the bottom of the carbon cylinder is formed a series of holes $c, c$, which extend through the carbon but do not penetrate the porous cup, and near the top of the cylinder is formed another series of similar holes $c', c'$. It is essential, in order that the invention may be properly carried out, that the two series of holes shall be entirely independent and separated by a considerable space, the middle portion of the carbon cylinder, as shown in Fig. 2, being unperforated. It is also extremely desirable that there shall be surface contact between the carbon cylinder and the porous cup, especially throughout that portion which lies between the two series of holes, in order that there may be no channels between the two which would conduct the electrolyte to other portions of the porous cup. The positive or zinc electrode E is preferably made as a solid rod or bar which is fluted so that it may offer a considerable surface, as shown in Figs. 4 and 5, and is placed within the porous cup.

In setting up the battery the porous cup may be filled with pure water and in the jar A, outside of the porous cup and the carbon is placed first a quantity of sulphuric acid somewhat diluted and then water having dissolved therein a small quantity of chromate of calcium, which I have found to be highly effective in preventing the deposition of "salts" or crystals upon the electrode. Next above the water is placed nitric acid as a depolarizer. For a two quart jar there should be about one quart of sulphuric acid, one-half pint of water with a teaspoonful of chromate of calcium dissolved therein, and one pint of nitric acid. The water within the porous cup will become acidulated by the passage of the acids through the holes in the carbon and through the walls of the porous cup, but the water near the ends of the zinc will become acidulated before that in the middle portion of the cup by reason of the provision of the holes at the top and bottom of the carbon cylinder, and as a consequence the zinc will be attacked more nearly over its entire surface, rather than in the middle, as heretofore, which resulted often in an eating of the zinc into two parts long before its substance was consumed.

A battery constructed and arranged in the manner described, with the unmixed liquids of the electrode arranged in different horizontal strata, is not only found to possess a high electro-motive force but the zinc remains in a serviceable condition for a much longer time than heretofore and by reason of the action of the chromate of calcium the cleaning of the electrodes is less often necessary.

Practical tests of the improved battery have shown a constant electro-motive force such that with two cells a six-volt motor could be run at two thousand five hundred revolutions per minute for a period of fifty-two hours.

I claim as my invention—

1. In a galvanic battery, the combination of a containing jar, a porous cup having an inclosing layer of carbon the portion of which between its ends is imperforate, said layer of carbon constituting an electrode, a second electrode, and an electrolyte composed of unmixed liquids, arranged in a different horizontal strata whereby action is set up on the second electrode at its ends rather than at its middle, substantially as shown and described.

2. An electrolyte for galvanic batteries composed of sulphuric acid, water having chromate of calcium dissolved therein, and nitric acid, the said components being unmixed and arranged in the cell in the order named, substantially as shown and described.

In testimony whereof I have signed my name to this specification in the presence of two subscribing witnesses.

LOUIS F. JOHNSON.

Witnesses:
   A. N. JESBERA,
   A. WIDDER.